US009038365B2

(12) United States Patent
Fichera

(10) Patent No.: US 9,038,365 B2
(45) Date of Patent: May 26, 2015

(54) THRUST GENERATOR

(76) Inventor: James Michael Fichera, Boynton Beach, FL (US)

( * ) Notice: Subject to any disclaimer, the term of this patent is extended or adjusted under 35 U.S.C. 154(b) by 2171 days.

(21) Appl. No.: 12/000,726

(22) Filed: Dec. 17, 2007

(65) Prior Publication Data

US 2009/0151319 A1    Jun. 18, 2009

(51) Int. Cl.
*F03B 17/00* (2006.01)
*B63H 19/00* (2006.01)

(52) U.S. Cl.
CPC .............. *F03B 17/005* (2013.01); *B63H 19/00* (2013.01); *Y02E 10/20* (2013.01)

(58) Field of Classification Search
CPC ........ B63H 19/00; F03B 17/005; Y02E 10/20
USPC ........................................................ 60/201
See application file for complete search history.

(56) References Cited

U.S. PATENT DOCUMENTS 3,527,975 A * 9/1970 Mead ............................. 313/171
3,604,207 A * 9/1971 Waidelich ....................... 60/262

FOREIGN PATENT DOCUMENTS

JP    08-061217 A    3/1996
JP    06-334690      6/1996

OTHER PUBLICATIONS http://en.wikipedia.org/wiki/Spacecraft_propulsion ( Feb. 2012), pp. 1-22.*
International Search Report dated Mar. 31, 2009 in relation to international application No. PCT/US2008/009743.
Office Action issued May 12, 2014 in corresponding Korean patent application.

* cited by examiner

*Primary Examiner* — Ted Kim
(74) *Attorney, Agent, or Firm* — Maier & Maier, PLLC

(57) ABSTRACT

A method, system and apparatus for generating thrust. The method, system and apparatus can include a fuel that may be accelerated into one or more openings on a rotating wheel. The rotating wheel, which may be balanced, may then have a temporary increase in mass in one location on the wheel. Additionally, the fuel that is accelerated into one or more openings in the wheel may be decelerated and may exert an outward force on the wheel. This generation of force can be repeated and increased to provide thrust.

16 Claims, 3 Drawing Sheets

THRUST GENERATOR

BACKGROUND

Modern thrust generation devices are inefficient and generate significant emissions. Propulsion devices such as the internal combustion engine only operate at about 20%-40% mechanical efficiency and rely almost entirely on fossil fuels. Further, these engines emit a variety of harmful emissions, such as carbon monoxide and other greenhouse gases. Additionally, these engines are not capable of generating significant amounts of thrust or power over prolonged periods without mechanical failure or without exhaust their fuel supply.

Other propulsion devices, such as jet engines, are capable of producing much greater amounts of thrust and, often, greater thrust over a greater amount of time. For example, jet engines are well known to propel aircraft to several times the speed of sound and propel space craft beyond Earth's atmosphere. Jet engines, however, are also limited by their prodigious fuel consumption and typically require exotic fuel mixtures or types or extremely volatile or difficult to store fuels. Jet engines also produce an immense amount of emissions. Thus, while jet engines are capable of generating significant amounts of thrust, they are often limited in the amount of time or distance that they can travel due to the fuel load that they must carry and support. Additionally, the weight of the fuel is often a significant problem when a vessel having one or more jet engines first attempts to propel itself under its own power.

Still other propulsion devices, such as nuclear powered engines, have the capability to produce thrust for significant amounts of time. These engines, however, require a party to have nuclear capabilities in order to first obtain the fuel and then produce the engine. Additionally the potential drawbacks of nuclear power are well known and are not suitable or feasible for most applications where propulsion is desired.

SUMMARY

A method, system and apparatus for the generation of thrust. In one exemplary embodiment, a method of generating thrust may involve forming at least one hole in a donut-shaped wheel, and the at least one hole may further comprise a plurality of passages that may pass through the wheel and that may have at least one angled turn therein. The method may also include steps for rotating the wheel in a balanced fashion and pushing matter into the at least one hole in the wheel. Further, the method may continue by refracting the matter in the at least one hole in the wheel off of the at least one angled turn in the plurality of passages in the at least one hole and, in some embodiments, producing thrust from the force of the matter refracting off of the at least one angled turn in the plurality of passages in the at least one hole. In some further exemplary embodiments, the method may also include steps for extracting the matter from the at least one hole in the wheel through a combination of centrifugal force and a magnet positioned substantially proximate an exterior portion of the wheel and the hole. Also, the method may include a step for sending the matter from a position outside the at least one hole to a storage tank.

Another exemplary embodiment may include a system for producing thrust. The system can include a balanced wheel that may have at least one hole formed therethrough. The plurality of holes in the wheel may each have a funnel-shaped opening and a plurality of curved tubes disposed inside the at least one hole that may extend from an interior portion of the wheel to an exterior portion of the wheel, the plurality of tubes further having diameters that are less than a diameter of the at least one hole. The system may further include a pump that can pump matter from a storage tank through an input tube, where the input tube may be designed to deposit matter substantially proximate an interior portion of the at least one hole. The system may also have a wire that may provide an electric charge substantially proximate an interior portion of the at least one hole that may accelerate the matter deposited substantially proximate the interior portion of the at least one hole into the at least one hole, may increase the mass of the wheel at the location of the at least one hole and may generate force on the wheel. Further exemplary embodiments of the system may have a magnet that extracts the matter from the wheel and a vacuum that pulls the matter previously extracted from the wheel into the storage tank.

In yet another exemplary embodiment, a system for generating thrust in a closed environment may be described. This system may have means for storing mercury as mercury vapor and means for pumping the mercury vapor. The system may also include means for rapidly accelerating the mercury vapor into at least one opening on a rotating wheel and means for passing the mercury vapor through the wheel. In some exemplary embodiments, the system can have means for generating outward force within the wheel as well as means for extracting the mercury vapor from the wheel. Still further exemplary embodiments can include means for returning the mercury vapor to the storage means and means for balancing rotation of the wheel.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention," "exemplary embodiment," "embodiment" or "example" do not require that all embodiments of the invention include the discussed feature, advantage or mode of operation.

Figure 1:
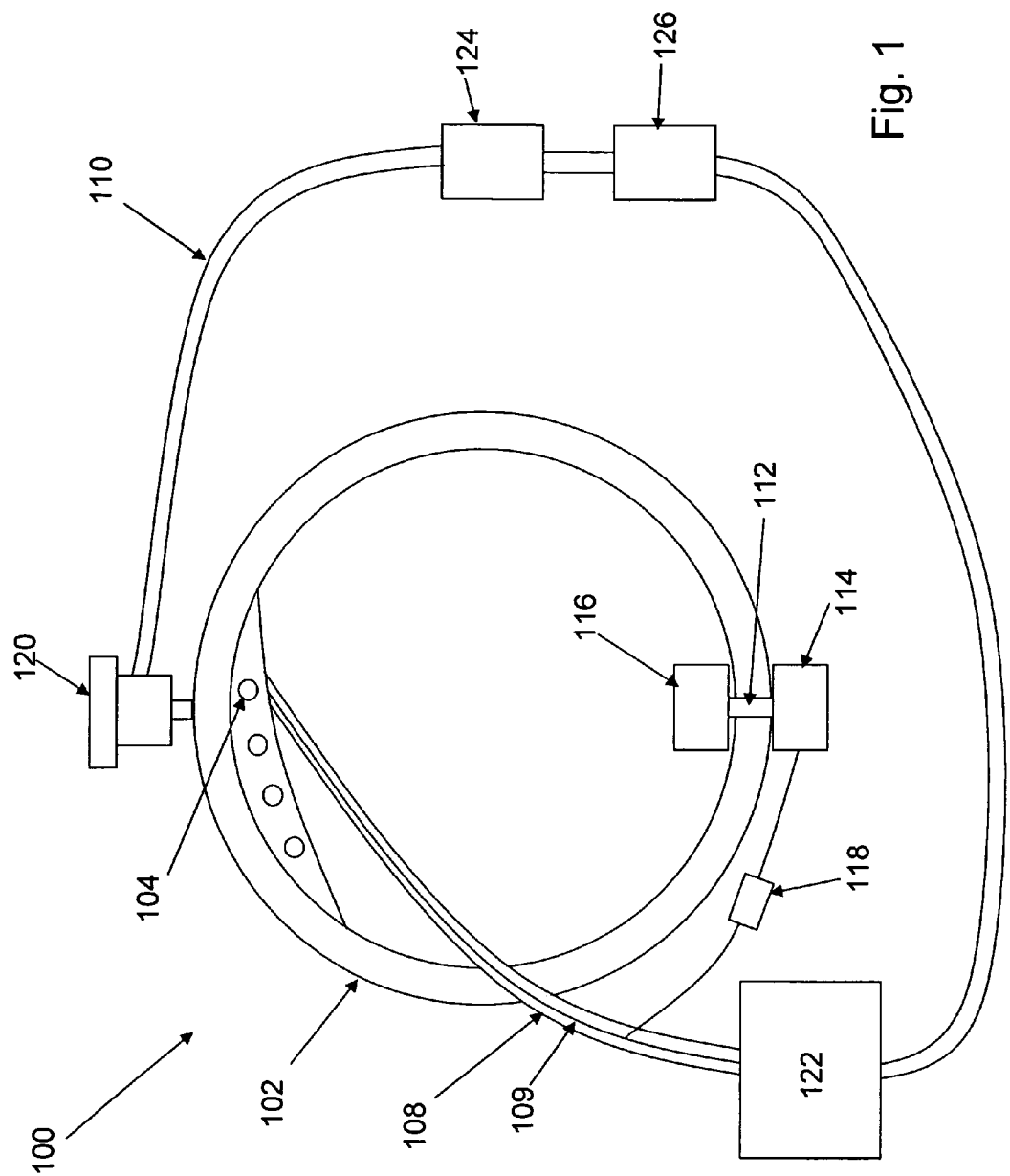
FIG. 1 is an exemplary diagram showing a thrust generator.

In one exemplary embodiment, as shown in FIG. 1, a system, method and apparatus for thrust generation are disclosed. For example, a device, such as device 100, may be used to generate thrust. The device may include a variety of components which may be constructed out of any of a variety of materials. Additionally device 100 could be capable of being attached, coupled or otherwise associated with any of a variety of types of vehicles or vessels and may provide power, thrust or propulsion to any type of vehicle or vessel.

Thus, in this exemplary embodiment, a wheel, such as a wheel 102 formed in a donut shape, may have one or more holes drilled into it. The one or more holes 104 may be any size or shape, for example funnel-shaped with a tapered end of the funnel-shaped hole or a narrow opening of a hole positioned towards the exterior of the wheel. In other examples described below, the holes 104 may have other structures disposed therein. Additionally, the wheel 102 may be formed in any size and may have any height and any depth. Further, the wheel 102 may have any weight. In a further exemplary embodiment, the wheel 102 may be allowed to spin or have a force applied to it that may allow it to spin, for example through the use of an electric motor or any other rotation-enabling force. Further, the wheel may be balanced so as to prevent any variations in movement. As such, any hole formed in the wheel 102 or any other components that may be coupled or attached to the wheel 102 may be balanced so as not to affect the rotation of wheel 102. Additionally, wheel 102 may be mounted in such a manner as to avoid or limit rotational or other losses due to friction. Thus, in some exemplary embodiments, wheel 102 may be mounted on magnetic bearings.

In a further exemplary embodiment, the wheel 102 may be formed out of any of a variety of materials. In some exemplary embodiments, the wheel may be formed of an insulating material that is non-ferromagnetic, an insulator, has a high tensile strength and that exhibits low thermal expansion. One such material is Zerodure® glass, but any other material known to one having ordinary skill in the art may be used.

Figure 2:
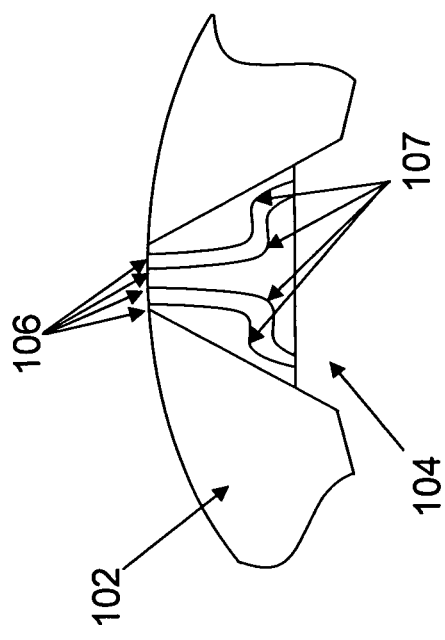
FIG. 2 is an exemplary diagram showing a cross section of a wheel component of a thrust generator.

As shown in exemplary FIG. 2, a cross section of the wheel 102 may be shown. In this exemplary view, a portion of the wheel 102 and one hole 104 are shown. In this cross section, it can be seen that hole 104 may be formed in a funnel-shaped fashion, with a larger opening disposed towards the interior portion of the wheel 102. Hole 104 may be formed so as to allow for the input of matter, such as vapor or gas, to be easily inputted into hole 104.

In a further exemplary embodiment, and still referring to FIG. 2, tubes 106 may be formed in holes 104. For example, a funnel-shaped portion of hole 104 may extend approximately 40% of the way, or any other desired distance, through wheel 102. At this distance, for example as shown in FIG. 2, a number of tubes 106 may be formed. The tubes 106 may have funnel-shaped entrances, similar to the funnel-shaped entrance of holes 104. Further, tubes 106 may each extend the remaining distance through wheel 102 such that they may extend to an exterior portion of wheel 102. Further, tubes 106 may each include a curve, such as curve 107. Each curve 107 may be a curve of any degree, for example a curve of between about 30 degrees and about 90 degrees. The curves 107 may be such that matter traveling through holes 104 and into tubes 106 collides with a wall proximate curves 107. This collision may, in some exemplary embodiments, provide or distribute a force towards an exterior portion of wheel 102, which may cause wheel 102 to move in the direction of the force.

Figure 3:
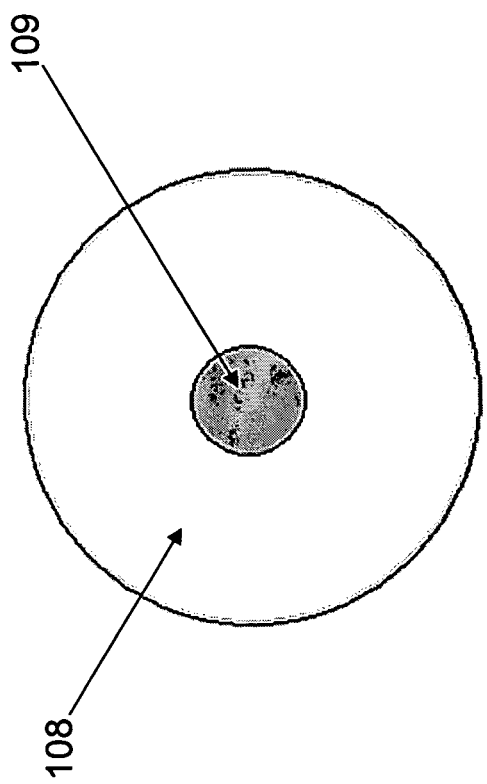
FIG. 3 is an exemplary diagram showing a cross section of piping for carrying matter.

In a further exemplary embodiment, and referring to both FIGS. 1 and 3, input tubing and wiring may be used in conjunction with device 100. In one exemplary embodiment, input tubing 108 may be tubing that is coupled at one end to storage tank 122 and that has an opening at an opposite end, the opposite end located proximate to a hole 104 in wheel 102. Input tubing 108 may be such that it allows for the input of matter, for example matter such as mercury that may be in gaseous or vapor state, from storage tank 122 and allow it to be transferred or inputted to hole 104, or proximate thereto. In some further exemplary embodiments, the movement or transfer of matter through input tubing 108 may be assisted, aided, prompted or motivated through the use of a pump, such as pump 126. Further, storage tank 122 may be any type of tank and may include capabilities such as heating, cooling or pressurizing so as to keep any matter stored in tank 122 in a desired state, for example solid, liquid or gaseous.

Additionally, and as further shown in the cross section in FIG. 3, wiring 109 may be disposed inside of input tubing 108. Wiring 109 may be insulated in any manner known by one having ordinary skill in the art so as to prevent any interaction between any matter traveling in input tubing 108 and wiring 109. Additionally, wiring 109 may be connected to an electrical power source. In one embodiment, wiring 109 is connected to capacitor 118. As described in more detail below, capacitor 118 may provide an electrical charge or high voltage pulse into wiring 109. The electrical charge or pulse may be varied in strength depending on the desired size of the charge as well as the amount of vapor or other matter which is to be provided through input tube 108. The electrical-charge or high voltage pulse may travel through wiring 109 and may be discharged at an end portion of wiring 109, for example proximate hole 104 in wheel 102, in any manner known to one having ordinary skill in the art.

In a further exemplary embodiment, and referring back to FIG. 1, the timing of a charge or pulse provide by capacitor 118 to wiring 109 may be coordinated with, for example, any rotation of wheel 102 and the placement of any desired hole 104. In this example a laser diode trigger system or laser switching device 112 may be utilized to provide the appropriate timing for the capacitor 118 to provide a charge. The laser switching device 112, which may be similar to an ignition system that may be used to control the timing in an internal combustion engine, may include both a recorder/receiver 116 and a transmitter 114. The laser switching device 112 may take into account any rotation, and, for example, any rotational speed of wheel 102, the location of holes 104, the desired hole 104 into which matter and an electrical charge are desired to be inputted and the location of the desired hole 104 with respect to input tubing 108 and wiring 109. Thus, in some embodiments, recorder/receiver 116 will record the time when an electrical charge should be sent through wiring 109. The recorder/receiver 116 can then send a signal to transmitter 114. Transmitter 114 may then transmit a signal to capacitor 118, which may then discharge an electrical charge or high voltage pulse to wiring 109. The charge or pulse may then travel through wiring 109 and be discharged at a distal end of wiring 109, for example substantially proximate hole 104 of wheel 102. Also, in some further exemplary embodiments, capacitor 118 may discharge any amount of times, for example approximately 1700 times per second. Thus the wheel 102 may be capable of having vapor or other matter inserted into hole 104 100,000 times or more per minute. Also, in some further exemplary embodiments, more than one capacitor or capacitors having any desired amount of capacitance may be used in order to provide a desired number of discharges. Additionally, in some further exemplary embodiments, a signal may be sent from laser switching device 112 to pump 126 to prompt pump 126 to increase power or otherwise activate to pump matter from storage tank 122 through input tubing 108 and to a distal end of input tubing 108, for example substantially proximate hole 104 of wheel 102.

Referring back to FIG. 1, and in a further exemplary embodiment, matter may be introduced into the wheel 102 in any of a variety of manners in order to generate movement of the wheel 102 and, correspondingly, thrust. In one example, matter may be inputted into hole 104 of wheel 102 through input tubing 108. The matter used may be any type of matter, for example mercury or mercury vapor or gas. Mercury vapor may be used, for example, because of its natural, elemental characteristics. Thus, mercury vapor may be stored in storage tank 122 and inputted to hole 104 of wheel 102 through the use of, for example, pump 126. As described previously, pump 126 may be activated at any time or may be used to continuously pump matter throughout device 100. Additionally, and as also described previously, capacitor 118 (or any other type of electrical storage or generation device) may provide an electrical charge or high voltage pulse to wiring 109. The matter, such as mercury vapor, may arrive at a distal end of input tubing 108 at substantially the same time as the electrical charge or high voltage pulse is discharged from wiring 109. Additionally, these events may occur at a time substantially simultaneous to the positioning of a hole 104 on wheel 102 (which may be rotating at any speed) at a desired position above input tube 108 and wiring 109.

When the electrical charge or high voltage pulse is discharged from wiring 109, it may react with the matter exiting input tubing 108. If, for example, mercury vapor is exiting input tubing 108, the mercury vapor may be ionized and put into an excited state as a result of the electrical charge or high voltage pulse. This may, in turn, cause the mercury vapor to rapidly accelerate and travel rapidly into hole 104 of wheel 102.

Still referring to FIG. 1 and referring back to the cross section of wheel 102 shown in FIG. 2, the mercury vapor may flow rapidly into hole 104. The introduction and direction of the mercury vapor into hole 104 may be assisted through the use of the tapered sides of hole 104, which may allow for the flow of the vapor in a desired direction. Additionally, the introduction of vapor, or any other matter, into hole 104 of wheel 102 will increase the mass on that portion of wheel 102 in the location of hole 104. The increase in mass at a location of hole 104 on wheel 102 may result in centrifugal motion. Additionally, if wheel 102 is already rotating, a renewed or repeated increase in mass at one location of wheel 102 may increase or multiply the centrifugal motion of wheel 102. As shown in FIG. 3, the vapor in its ionized and excited state may be moving rapidly and may be directed into tubes 106. There may be any number of tubes 106 inside hole 104 and the tubes may be of any diameter and length desired. For example, if the size of wheel 102 is increased, the size of hole(s) 104 may be increased and the size and number of tubes 106 may be increased correspondingly. In some embodiments, the size of wheel 102 and other components of device 100 may be increased to generate a greater amount of thrust.

As shown in FIG. 2 and as previously described, tubes 106 each have curves disposed therein. The rapidly moving mercury vapor enters tubes 106 through hole 104. The distribution of mercury vapor or any other matter traveling through hole(s) 104 may be made in any manner desired. The tubes 106 may also be formed after hole 104 in such a manner as to allow the vapors or other matter to proceed into the tubes 106 with little or no reduction in speed. In some exemplary embodiments, the movement of the vapors or other matter from the hole 104 to the tubes 106 may be assisted by having funnel-shaped openings for each of tubes 106.

After the vapor or matter enters tubes 106, it remains traveling at a high rate of speed. The vapor or matter will then encounter one or more curves 107 in tubes 106. Due to the curves, the vapor or matter traveling through tubes 106 will collide with a wall portion of tubes 106, exerting a force on the walls of tubes 106. This force, when coupled with the presence of the vapor, or other matter, in wheel 102, will generate additional force, or thrust, causing wheel 102 to move in the direction of the force applied.

In a further exemplary embodiment, and referring back to FIG. 1, the vapor, or other matter, that is in tubes 106 of hole 104 in wheel 102 may be removed quickly. For example, it may be desirable to remove the vapors or other matter before the wheel 102 rotates a predetermined amount, for example about 5 degrees to about 40 degrees. In some exemplary embodiments, it may be desirable to extract the vapor or other matter from wheel 102 in order to prevent the additional mass and force generated by its presence from rotating too far in wheel 102, which may cancel any centrifugal force or other force caused by the presence and/or force applied by the vapor or other matter. One manner of extracting the vapor or other matter from wheel 102 may be to position a magnet substantially proximate the distal ends of tubes 106 of hole 104. Thus, as shown in FIG. 1, a magnet 120, which may be any type of magnet, such as an electromagnet, may be disposed on an exterior portion of wheel 102 substantially proximate the distal ends of tubes 106. In some exemplary embodiments, magnet 120 may act to attract ionized vapor or other matter, thus pulling it out of wheel 102 and drawing it into exhaust tube 110. Further, the magnet 120 may act as a ground, which may allow for any electrical discharge from wire 109 to flow in to the direction of magnet 120. The flow of any electrical discharge from wire 109 to magnet 120 may further act to accelerate any matter into hole 104 of wheel 102.

In a further exemplary embodiment, after the vapor or other matter is drawn into exhaust tube 110, vacuum 124, which may be a high pressure vacuum, may be activated and may draw the vapor or other matter in exhaust tube 110 towards storage tank 122. In some further exemplary embodiments, pump 126 may be positioned aft of vacuum 124 along exhaust tube 110 to aid in propelling vapor or other matter into storage tank 122. Therefore, device 100 may be a closed system insofar as it does not utilize the intake of any materials or matter and does not exhaust any material or matter into an ambient environment. Further, any electrical power used with device 100 may be generated by any electrical generation device known to one having ordinary skill in the art that may be coupled to device 100, for example a fuel cell.

In another exemplary embodiment, device 100 may be coupled to any desired device to provide thrust or propulsion. When a fuel, such as mercury vapor, is continuously inputted into wheel 102 in the above-described manner, device 100 may continuously produce thrust or propulsion. Additionally, the amount of thrust or propulsion generated may be increased exponentially through the continued and/or more rapid introduction of fuel into wheel 102. Device 100 may be coupled or attached to any desired object and therefore used to provide thrust or propulsion to that object. For example, it is envisioned that any type of aircraft, boat or space vessel, or any other type of vehicle or vessel may be coupled with device 100 to receive propulsion. Additionally, device 100 may be coupled with similar or identical devices to provided multiple sources of thrust or propulsion and correspondingly increase the thrust or propulsion that the devices may be coupled with, such as the aforementioned aircraft, boat, space vessel or any other type of vessel.

Figure 4:
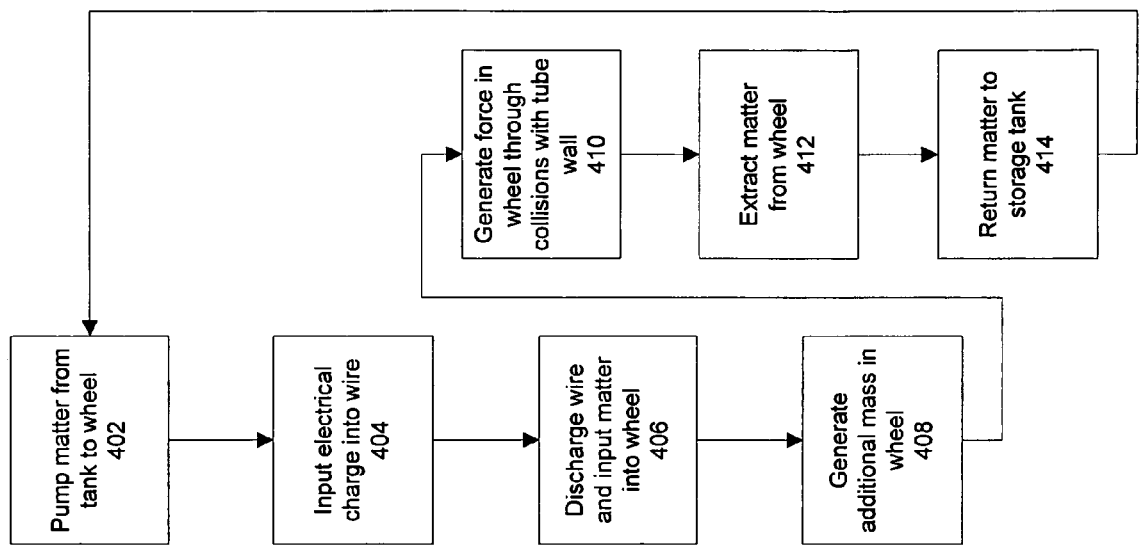
FIG. 4 is a flowchart showing exemplary steps in a thrust generation process.

In another exemplary embodiment, and referring to the exemplary flowchart shown in FIG. 4, a repeatable process for generating thrust or propulsion may be described. In step 402 matter, such as mercury vapor, may be pumped from a storage tank or other area where matter may be held into an input tube associated with a donut-shaped wheel. Then, in step 404, an electrical charge may be input into a wire. The wire may be substantially associated with or run substantially parallel to the input tube into which matter had previously been pumped. Next, in step 406, the matter previously inputted into an input tube may be discharged from the input tube and, through a reaction between the matter and an electrical discharge that is substantially simultaneous with the discharge of the matter from the input tube, the matter may be inputted into an interior portion of the wheel, for example a hole in an interior wall of the wheel. The rapid input of the matter into the wheel generates mass in the wheel, as shown in step 408. Then, in step 410, the matter may be sent through the wheel and may collide with one or more walls disposed inside the wheel, which may generate additional force within the wheel. The result of the addition of the matter to the wheel in step 408 and the force generated in step 410 may be such as to generate a centrifugal force on the wheel, which may cause the wheel to move in the direction of the force. Additionally, in some further exemplary embodiments, the wheel may rotate, for example, due to a centrifugal force. Following steps 408 and 410, it may be desirable to rapidly extract the matter from the wheel in step 412. This extraction may be performed, in some exemplary embodiments, with the help of a magnet disposed on an exterior portion of the wheel and substantially proximate the hole into which the matter was inputted. The rapid extraction of the matter in the wheel may, in some examples, allow the wheel to maintain centrifugal motion while also allowing it to generate force in a desired direction. The matter may then be returned, in step 414, to the tank from which it was drawn in step 402. The process may then revert to step 402 and may continue repeatedly as desired. The repetition of the process may allow for the accumulation or increase of the centrifugal force acting on the wheel as well as the increase or accumulation of force in a desired direction, allowing for the movement of the wheel in a desired direction. In many circumstances the increase or accumulation of force may take place rapidly, so as to allow for rapid acceleration of the wheel both centrifugally and directionally. Additionally, as described previously, this methodology may be used with any other known technology to provide thrust or propulsion, for example, to move another object or objects over land, water, air or space. Further, the methodology may be coupled with any number of other devices utilizing the methodology so as to further increase the amount of thrust or propulsion to any desired level.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of generating thrust, comprising:
    forming at least one hole in a donut-shaped wheel, the at least one hole further comprising a plurality of passages that pass through the wheel and that have at least one angled turn therein;
    rotating the wheel in a balanced fashion;
    pushing matter into at least one hole in the wheel;
    refracting the matter in the at least one hole in the wheel off of the at least one angled turn in the plurality of passages in the at least one hole;
    producing thrust from the force of the matter refracting off of the at least one angled turn in the plurality of passages in the at least one hole;
    extracting the matter from the at least one hole in the wheel through a combination of centrifugal force and a magnet positioned substantially proximate an exterior portion of the wheel and the hole; and
    sending the matter from a position outside the at least one hole to a storage tank.

2. The method of claim 1, further comprising mounting the wheel on magnetic bearings.

3. The method of claim 1, wherein the at least one hole is funnel shaped with a wide opening on an interior portion of the wheel and a narrow portion on an exterior portion of the wheel.

4. The method of claim 1, wherein the plurality of passages are formed substantially between an opening of the at least one hole and an exit of the at least one hole.

5. The method of claim 1, further comprising forming the plurality of passages with curves between about 30 degrees and about 90 degrees.

6. The method of claim 1, wherein the matter is extracted from the wheel before the wheel rotates to about 40 degrees.

7. The method of claim 1, further comprising:
    pumping the matter through at least one of the passages having a distal end substantially proximate the at least one hole from the storage tank;
    sending an electric charge through a wire to a location proximate the at least one hole;
    discharging the electric charge at substantially the same time the pumped matter reaches the at least one hole in the storage tank;
    accelerating the matter into the at least one of the passages through a reaction between the matter and the electric charge.

8. The method of claim 7, further comprising timing the electric charge that is sent through the wire through the use of a laser switching device.

9. The method of claim 1, further comprising forming the wheel out of a material with low thermal expansion, low conductivity, high tensile strength and low magnetivity.

10. A system for producing thrust, comprising:
    a balanced wheel having a plurality of holes formed therethrough, the plurality of holes comprising:
        a funnel-shaped opening; and
        a plurality of curved tubes disposed inside the at least one hole and extending from an interior portion of the wheel to an exterior portion of the wheel, the plurality of tubes further having diameters that are less than a diameter of the at least one hole;
    a pump that pumps matter from a storage tank through an input tube, the input tube for depositing matter substantially proximate an interior portion of the at least one hole;
    a wire that discharges an electric charge substantially proximate an interior portion of the at least one hole to accelerate the matter deposited substantially proximate the interior portion of the at least one hole into the at least one hole, increase the mass of the wheel at the location of the at least one hole and generate force on the wheel;
    a magnet that extracts the matter from the wheel; and
    a vacuum that pulls the matter extracted from the wheel into the storage tank.

11. The system of claim 10, wherein the force generated on the wheel causes the wheel to rotate.

12. The system of claim 11, wherein the matter is completely extracted from the wheel before the wheel rotates about 40 degrees.

13. The system of claim 10, wherein the magnet is an electromagnet.

14. The system of claim 10, further comprising a laser switching device that repeatedly discharges an electric charge to react with matter that is repeatedly deposited substantially proximate an interior portion of the at least one hole.

15. The system of claim 10, wherein the wire is disposed in an interior portion of the input tube.

16. The system of claim 10, wherein the plurality of curved tubes each have a curve of about 30 degrees to about 90 degrees.

* * * * *